United States Patent [19]

Burgin

[11] Patent Number: 5,458,215
[45] Date of Patent: Oct. 17, 1995

[54] TREE STAND LEVELER

[76] Inventor: Robert C. Burgin, 23982 Canoe Rd., Elgin, Iowa 52141

[21] Appl. No.: 260,465

[22] Filed: Jun. 14, 1994

[51] Int. Cl.⁶ ..................................................... A45F 3/26
[52] U.S. Cl. ................................................ 182/187; 182/188
[58] Field of Search ................................. 182/187, 188, 182/116

[56] References Cited

U.S. PATENT DOCUMENTS

| 3,664,460 | 5/1972 | Zdroik | 182/187 |
| 4,819,763 | 4/1989 | Grote | 182/187 |
| 4,942,942 | 7/1990 | Bradley | 182/187 |

FOREIGN PATENT DOCUMENTS 809611  5/1951  Germany ........................ 182/187

Primary Examiner—Alvin C. Chin-Shue

[57] ABSTRACT

A tree stand leveler comprising a sleeve having a base end and a tip end; at least one adjustable mounting bracket coupled across the sleeve and adapted for securing a tree stand thereupon; a T-shaped extension rail having a cross leg with an base leg extended therefrom and adjustably coupled to the sleeve; and a coupling mechanism for adjustably coupling the cross leg of the extension rail to a tree; whereby adjustment of the mounting bracket, sleeve, and coupling means enable a tree stand to be leveled.

1 Claim, 3 Drawing Sheets

TREE STAND LEVELER

BACKGROUND OF THE INVENTION

1. Field of the Invention

The present invention relates to a tree stand leveler and more particularly pertains to allowing a tree stand coupled to a tree to be placed in a leveled orientation with a tree stand leveler.

2. Description of the Prior Art

The use of leveling mechanisms is known in the prior art. More specifically, leveling mechanisms heretofore devised and utilized for the purpose of placing a tree stand in a leveled orientation are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,997,063 to Bradley discloses a collapsible and adjustable tree stand. U.S. Pat. No. 5,009,283 to Prejean discloses a hunting stand system. U.S. Pat. No. 5,016,733 to Bradley discloses a wedging tree stand. U.S. Pat. No. 5,078,232 to Hancosky discloses a tree stand. U.S. Pat. No. 5,090,506 to Womack et al. discloses an adjustable hunter's tree stand. U.S. Pat. No. 5,234,077 to Sheriff discloses a hunting tree stand.

While these devices fulfill their respective, particular objective and requirements, the aforementioned patents do not describe a tree stand leveler that allow a tree stand to be readily adjusted.

In this respect, the tree stand leveler according to the present invention substantially departs from the conventional concepts and designs of the prior art, and in doing so provides an apparatus primarily developed for the purpose of allowing a tree stand coupled to a tree to be placed in a leveled orientation.

Therefore, it can be appreciated that there exists a continuing need for new and improved tree stand leveler which can be used for allowing a tree stand coupled to a tree to be placed in a leveled orientation. In this regard, the present invention substantially fulfills this need.

SUMMARY OF THE INVENTION

In the view of the foregoing disadvantages inherent in the known types of leveling mechanisms now present in the prior art, the present invention provides an improved tree stand leveler. As such, the general purpose of the present invention, which will be described subsequently in greater detail, is to provide a new and improved tree stand leveler and method which has all the advantages of the prior art and none of the disadvantages.

To attain this, the present invention essentially comprises, in combination, a rigid, elongated, and tubular sleeve having a base end and a tip end. A bored end cap is inserted within and coupled to the tip end of the sleeve. A pair of spaced mounting brackets is included with each mounting bracket having a cross-beam perpendicularly coupled to the sleeve to define a rack adapted to hold a tree stand thereon. Each end of each cross-beam has an adjustable tongue slidably coupled thereto with each pair of tongues defining a clamp for securing a tree stand to the rack. A rigid and T-shaped extension rail is included and has a cross leg with opposite free ends and a tubular base leg perpendicularly extended therefrom and terminated at a free end that is telescopically received in the sleeve. The base leg further includes a bored and threaded insert disposed therein at the free end thereof. Each free end of the cross leg further includes a threaded coupling hole disposed thereon. A pair of adjustment screws is included with each adjustment screw having a tip at one end, a head at the other end, and an intermediate portion therebetween. Each intermediate portion of each adjustment screw is threadably coupled within a separate coupling hole of the cross leg such that each tip end is extended therefrom and adapted to be adjustably secured to a tree when each head is tightened. A retaining pin is included and has an adjustment head positioned adjacent to the end cap and a threaded portion extended therethrough and threadably coupled with the insert of the base leg, whereby adjustment of the head of the retaining pin allows the sleeve to be telescopically extended and retracted. Lastly, a leveling vial is disposed on the sleeve between the mounting brackets for allowing a level position to be attained by adjusting the heads of the adjustment screws and the retaining pin accordingly, whereby enabling a tree stand to be leveled.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tree stand leveler which has all the advantages of the prior art leveling mechanisms and none of the disadvantages.

It is another object of the present invention to provide a new and improved tree stand leveler which may be easily and efficiently manufactured and marketed.

It is a further object of the present invention to provide a new and improved tree stand leveler which is of durable and reliable construction.

An even further object of the present invention is to provide a new and improved tree stand leveler which is susceptible of a low cost of manufacture with regard to both materials and labor, and which accordingly is then susceptible of low prices of sale to the consuming public, thereby making such a tree stand leveler economically available to the buying public.

Still yet another object of the present invention is to provide a new and improved tree stand leveler which provides in the apparatuses and methods of the prior art some of the advantages thereof, while simultaneously overcoming some of the disadvantages normally associated therewith.

Even still another object of the present invention is to provide a new and improved tree stand leveler for allowing a tree stand coupled to a tree to be placed in a leveled orientation.

Lastly, it is an object of the present invention to provide a new and improved tree stand leveler comprising a sleeve having a base end and a tip end; at least one adjustable mounting bracket coupled across the sleeve and adapted for securing a tree stand thereupon; a T-shaped extension rail having a cross leg with an base leg extended therefrom and adjustably coupled to the sleeve; and coupling means for adjustably coupling the cross leg of the extension rail to a tree; whereby adjustment of the mounting bracket, sleeve, and coupling means enable a tree stand to be leveled.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
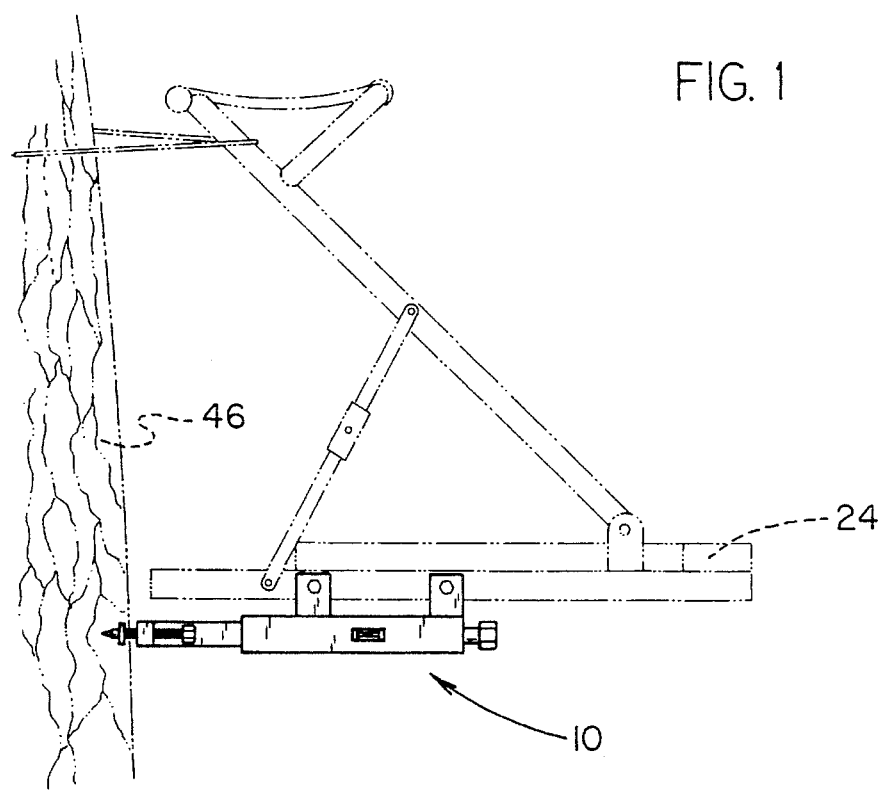
FIG. 1 is a side elevational view of the preferred embodiment constructed in accordance with the principles of the present invention coupled between a tree and a tree stand for placing the tree stand in a level orientation.
Figure 2:
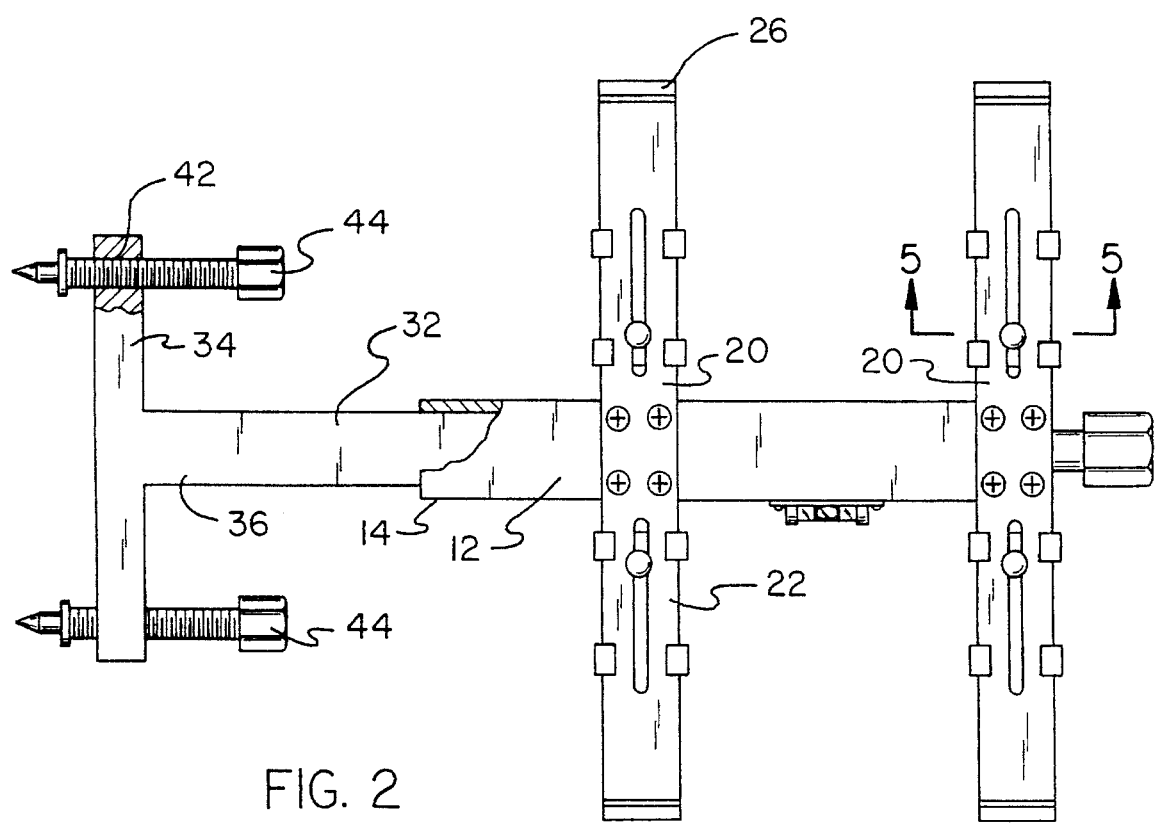
FIG. 2 is a plan view of the present invention with portions removed.
Figure 3:
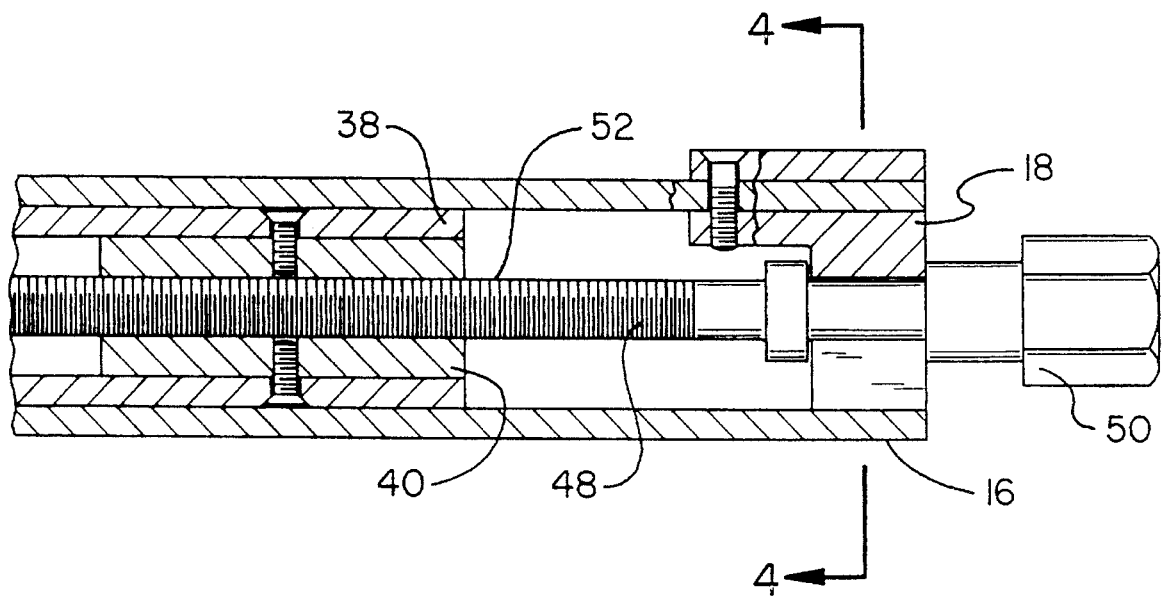
FIG. 3 is a cross-sectional view of the present invention depicting the extendable coupling between the sleeve and the base leg of the extension rail.
Figure 4:
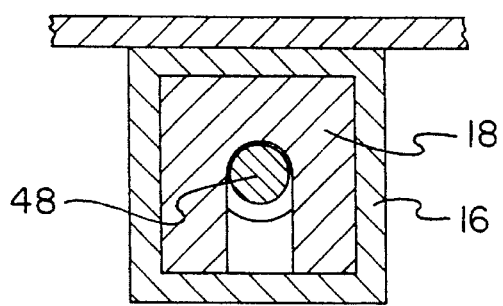
FIG. 4 is a cross-sectional view taken along the line 4—4 of FIG. 3.
Figure 5:
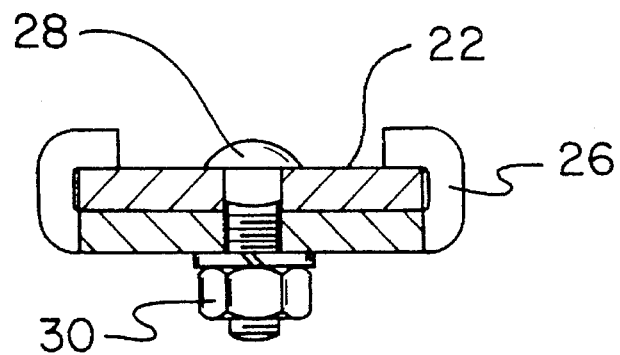
FIG. 5 is a cross-sectional view of the coupling between a tongue and cross-beam of the mounting bracket.
Figure 6:
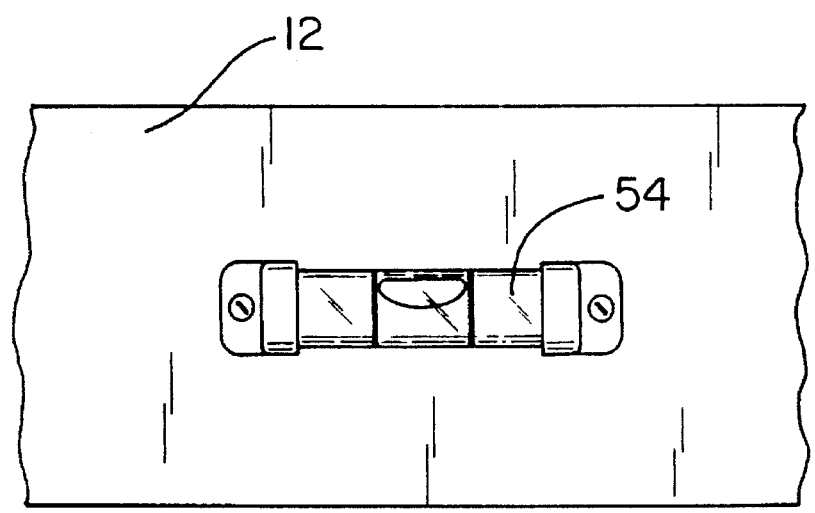
FIG. 6 is an enlarged view of the leveling vial depicted in FIG. 1.

With reference now to the drawings, and in particular, to FIG. 1 thereof, the preferred embodiment of the new and improved tree stand leveler embodying the principles and concepts of the present invention and generally designated by the reference number 10 will be described.

Specifically, the present invention includes seven major components. The major components are the sleeve, end cap, mounting brackets, extension rail, adjustment screws, retaining pin, and leveling vial. These components are interrelated to provide the intended function.

More specifically, it will be noted in the various Figures that the first major component is the sleeve 12. The sleeve is rigid and elongated. It is formed of a tubular material. The sleeve has a base end 14 and a tip end 16.

The second major component is the end cap 18. The end cap has a bore formed therethrough along its central axis. The end cap is inserted within and coupled to the tip end 16 of the sleeve. The end cap is used as a guiding mechanism in the present invention.

The third major component is the mounting brackets 20. The present invention includes a pair of spaced mounting brackets. Each mounting bracket has a cross-beam 22 coupled perpendicular to the sleeve 12 to define a rack. Each cross-beam is coupled to the sleeve with sets of screws. The rack is adapted for holding a tree stand 24 thereupon. Each end of each cross-beam has an adjustable tongue 26 slidably coupled thereto. Each pair of tongues defines a clamp for securing a tree stand to the rack. Once the tongue is adjusted it is secured to the rack with a bolt 28 and complimentary nut 30. The clamps should be the first components of the present invention to be secured to a tree stand by a user before leveling.

The fourth major component is the extension rail 32. The extension rail is rigid and T-shaped in structure. The extension rail has a cross-leg 34 with opposite free-ends. The extension rail also has a tubular base leg 36 perpendicularly extended from the cross-leg and terminated at a free-end 38. This free-end is telescopically received and slidable within the sleeve. The base leg of the extension rail has a bored and threaded insert 40 disposed therein. The insert is positioned near the free-end 38 of the extension rail. This insert is used as a guiding mechanism in conjunction with the guiding mechanism defined by the end cap. Furthermore, each free-end of the cross-leg has a threaded coupling hole 42 disposed thereon. These coupling holes are utilized for receiving screws for coupling the extension rail to a tree.

The fifth major component is the adjustment screws 44. The present invention includes a pair of adjustment screws. Each adjustment screw has a tip at one end, a head at the other end, and an intermediate portion therebetween. A radially extended flange is formed at the tip end for supporting the adjustment screw when secured to a tree. Each intermediate portion of the adjustment screw is threadably coupled within a separate coupling hole 42 of the cross-leg. In this configuration, each tip end is extended therefrom and adapted to be adjustably secured to a tree 46 when each head is tightened. The head of each adjustment screw may be struck with a hammer to secure the tip end to a tree. Now, the adjustment screw may be loosened or tightened in order to set the extension of the cross-leg from the tree.

The sixth major component is the retaining pin 48. The retaining pin has an adjustment head 50 positioned adjacent to the end cap 18. The retaining pin also has a threaded portion 52 extended from the adjustment head, through the end cap, and threadably coupled with the insert 40 of the base leg. As previously described, the end cap and the insert serve as guiding mechanisms for the retaining pin. Now, adjustment of the head of the retaining pin allows the sleeve to be telescopically extended and retracted.

The seventh major component is the leveling vial 54. The leveling vial is disposed on the sleeve 12 between the mounting brackets thereof. The leveling vial allows the sleeve to be placed in a level position when the heads of the adjustment screws and retaining pin are adjusted accordingly. When a sleeve is placed in a level position on a tree, this essentially places a tree stand coupled thereto in a level position.

Leveling is first performed by securing the mounting brackets securely to a tree stand. The adjustment screws are also forced into a tree such that each flange is in contact with the surface thereof. The upper portion of a tree stand is then secured accordingly. The horizontal pitch of the tree stand may now be adjusted by loosening or tightening the adjustment screws. This adjustment essentially sets the extension of the cross-leg of the extension rail from the tree. Vertical adjustments may be performed by tightening or loosening the adjustment head on the retaining pin. Given that the mounting brackets are secured to a tree stand, tightening the retaining pin with the adjustment screws in a fixed configuration thereby forces the sleeve downwards, thus moving the tree stand downward. In a similar fashion, when the adjustment head of the retaining pin is loosened, the extension of the sleeve from the extension rail with the adjustment screws in a stationary configuration forces the sleeve upwards, thereby moving the tree stand upwards. Thus, both horizontal and vertical positioning may be performed.

The present invention provides several advantages when utilized with a tree stand. First, it provides for an increased level of comfort, because the present invention levels a tree stand platform vertically and horizontally. Second, it provides for increased stability, because the present invention allows a tree stand to be utilized on leaning or odd shaped trees. Third, it provides for an increased level of silence since it restricts movement so that the tree stand makes less noise. Fourth, it provides increased versatility since the tree stand can be utilized in more locations.

The sleeve of the present invention is formed of a 1½"× 1½"×¼" aluminum square tube 10" long with one end sealed except for a ⅜" hole in the center. The base leg of the extension rail is formed 1"×1"×¼" aluminum square tube 9½" long with one end sealed except for ⅜" threaded hole in the center. The cross-leg is attached perpendicular to the base leg and formed of ¾"×¾"×¼" aluminum square tube which has ⅜" threaded holes in each end. The retaining pin is formed of one threaded steel shaft 8" long. The adjustment head may be formed of plastic. The adjustment screws are formed of two threaded steel shafts 3¾" long.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A tree stand leveler for allowing a tree stand coupled to a tree to be placed in a level orientation comprising, in combination:

a rigid, elongated, and tubular sleeve having a base end and a tip end;

a bored end cap inserted within and coupled to the tip end of the sleeve;

a pair of spaced mounting brackets, each mounting bracket having a cross-beam perpendicularly coupled to the sleeve to define a rack adapted to hold a tree stand thereon, each end of each cross-beam having an adjustable tongue slidably coupled thereto with each pair of tongues defining a clamp for securing a tree stand to the rack;

a rigid and T-shaped extension rail having a cross leg with opposite free ends and a tubular base leg perpendicularly extended therefrom and terminated at a free end that is telescopically received in the sleeve, the base leg further having a bored and threaded insert disposed therein at the free end thereof and each free end of the cross leg further having a threaded coupling hole disposed thereon;

a pair of adjustment screws, each adjustment screw having a tip at one end, a head at the other end, and an intermediate portion therebetween, each intermediate portion threadably coupled within a separate coupling hole of the cross leg such that each tip end is extended therefrom and adapted to be adjustably secured to a tree when each head is tightened;

a retaining pin having an adjustment head positioned adjacent to the end cap and a threaded portion extended therethrough and threadably coupled with the insert of the base leg, whereby adjustment of the head of the retaining pin allows the sleeve to be telescopically extended and retracted; and a leveling vial disposed on the sleeve between the mounting brackets for allowing a level position to be attained by adjusting the heads of the adjustment screws and the retaining pin accordingly, whereby enabling a tree stand to be leveled.

\* \* \* \* \*